Patented Dec. 20, 1927.

1,653,491

UNITED STATES PATENT OFFICE.

JOHN F. BORDEN, OF BERKELEY, CALIFORNIA, ASSIGNOR TO OLIVER CONTINUOUS FILTER COMPANY, OF SAN FRANCISCO, CALIFORNIA, A CORPORATION OF CALIFORNIA.

PROCESS FOR TREATING CANE-JUICE SETTLINGS.

No Drawing.   Application filed September 22, 1926. Serial No. 137,169.

This invention relates to a method or process for treating cane juice settlings.

The object of the invention is to render these settlings more amenable to filtration, whereby the rate of filtration may be appreciably increased, and the sucrose content of the resulting cake, or solids, may be appreciably reduced, by washing, more cheaply and more efficiently than is the case in other present-day methods of filtering this material.

In raw sugar mills, considerable difficulty has been encountered in filtering the mud or settlings drawn from the lower portion of the clarifiers or settlers, and especially so if the settlings have passed through a so-called "fine strainer" of from fifty to one hundred mesh previous to the process of settling; or if a cane "shredder" is included in the crushing equipment of the mill.

In either of the two latter cases, the particles of bagacillo present in the settlings are relatively much smaller in size than would otherwise be the case, thus rendering the filtration of the settlings unusually difficult.

In and by the present process, I subject the settlings to chemical treatment embodying the reaction of an alkali and an acid, resulting in the formation of a highly dispersed precipitate; and to such mechanical treatment as shall not only promote the above-mentioned chemical reaction, but shall also preserve the physical properties of the resulting precipitate.

The final end-point of the liquid constituent of the settlings, after the above-mentioned reaction has occurred, shall be on the acid side of the true neutral point. Thereupon the settlings will exhibit a pronounced "break", or coagulation, and will be in a condition more favorable for their filtration than would be the case had they not been subjected to the treatment covered by the invention.

To the settlings from the clarifiers or settlers, of a raw cane sugar mill, I introduce an alkali, such as lime, either in the form of milk-of-lime, or quick lime, together with free phosphoric acid; or a water-soluble phosphate, such as mono-calcium-phosphate; or a combination of free phosphoric acid and certain water-soluble phosphates.

The relative amounts of lime and phosphoric acid added must be such that sufficient precipitate shall be formed as shall properly produce the result sought, i. e., to both adsorb and envelop certain substances existing in the colloidal state throughout the body of the settlings.

I have found that to produce this result, lime should generally be added to the settlings until the liquid portion of the settlings shall show a hydrogen ion concentration such as is indicated by a pH value of 8.5 or thereabouts, whereupon phosphoric acid should be added until the liquid portion of the settlings shall show a pH value numerically less than 7.0, e. g., a pH value of from 6.0 to 6.9.

From the time the settlings are drawn from the clarifiers or settlers, during their treatment, and up to the time of their introduction into the filter, it is imperative that they remain in as quiescent a physical state as possible, in order to preserve, in so far as possible, the physical characteristics of the precipitated calcium phosphate. The agitation during the treatment, generally necessary to properly mix the settlings and the reagents, must be no more violent, and no longer continued, than is absolutely necessary for a proper intermixing of the materials involved.

With the settlings at the proper temperature during treatment, say from 70° C. to 90° C., and the above-described conditions having been obtained, it will be found that the settlings will, in most cases, exhibit a "break" or coagulation most pronounced, and that their filtration may be effected with marked advantages.

In adding the above reagents to the settlings, either one may be added before the other, and various amounts of either may be employed. Also, in case the settlings, as drawn from the clarifiers or settlers, be sufficiently alkaline with lime for the purpose intended, the phosphoric acid alone may be added.

The settlings as drawn from the clarifiers or settlers, should be at a temperature consistent with good boiling-house practice, i. e., from 80° C. to 95° C., and during the treatment here described the settlings should be held at such a temperature as shall render the treatment the most effective, i. e., from 75° C. to 90° C.

As soon as the acid end-point in the reaction above indicated is reached, and during the period of filtration of the settlings, the temperature of the settlings should be so controlled as to prevent any inversion of sucrose that might be objectionable. The maximum temperature for safety in this respect is probably about 85° C.

Cane juice settlings, in raw sugar mills, after being treated in the above manner, will be rendered more amenable to efficient filtration through filter cloth or other media than would otherwise be the case. More especially they may be efficiently filtered by means of a rotary vacuum filter, which, when this treatment is employed, is faster and more economical than other types of filters used for this purpose.

Cane juice settlings so treated will show a marked increase in the rate of filtration, the filtrate will be brighter and clearer, and the press cake can be more readily reduced of its sucrose content with less washwater.

A remarkable feature of the invention is that the source of phosphoric acid required for the treatment may be ordinary phosphatic fertilizer, such as commercial "super-phosphate" or "double super-phosphate". Furthermore, at least 90% of the phosphoric acid added for the treatment is readily available in the filter cake as fertilizer soon after the cake has been spread over the cane fields.

Having thus described my invention, what I claim as new and desire to secure by Letters Patent is:

1. A process for treating cane juice settlings, which consists of subjecting the settlings to the chemical reaction between a lime and a phosphoric acid, such that a resulting adsorbing and enveloping precipitate shall be formed and highly dispersed throughout the body of the settlings, and such that the final end point of the liquid constituent of the settlings shall be on the acid side of the true neutral point.

2. A process for treating cane juice settlings, which consists of subjecting the settlings to the chemical reaction between a lime and a phosphoric acid, such that a resultant adsorbing and enveloping precipitate shall be formed and highly dispersed throughout the body of the settlings, and such that the final end point of the liquid constituent of the settlings shall be on the acid side of the true neutral point, and thereafter filtering said settlings.

3. A process for the treatment of cane juice settlings which consists of introducing a lime and a phosphoric acid to bring about a reaction such that a resultant adsorbing and enveloping precipitate shall be formed and highly dispersed throughout the body of the settlings, and such that the final end point of the liquid constituent of the settlings shall be on the acid side of the true neutral point, whereby to render the settlings more amenable to filtration.

4. A process for the treatment of cane juice settlings, which consists of treating the same with lime and phosphoric acid or a water-soluble phosphate, such as mono calcium phosphate, to cause the formation of an adsorbing and enveloping precipitate throughout the body of the settlings, wherein the liquid constituent of said settlings, subsequent to the formation of the precipitate, shall show a hydrogen ion concentration such as is indicated by a pH value of from 6.0 to 6.9.

5. A process for the treatment of cane juice settlings, which consists of treating the same with lime and phosphoric acid or a water-soluble phosphate, to cause the formation of an adsorbing and enveloping precipitate throughout the body of the settlings, wherein the liquid constituent of said settlings, subsequent to the formation of the precipitate, shall show a hydrogen ion concentration such as is indicated by a pH value of from 6.0 to 6.9, and thereafter filtering said settlings.

6. A process of treating cane juice settlings, which consists of treating the same with such an amount of lime as shall cause the liquid constituent of the settlings to show a pH value of 8.0 or higher, then adding such an amount of phosphoric acid as shall cause the liquid constituent of said settlings to show a pH value of from 6.0 to 6.9.

7. A process of treating cane juice settlings, which consists of treating the same with such an amount of lime as shall cause the liquid constituent of the settlings to show a pH value of 8.0 or higher, then adding such an amount of phosphoric acid as shall cause the liquid constituent of said settlings to show a pH value of from 6.0 to 6.9, and thereafter filtering said settlings.

8. A process for the treatment of cane juice settlings, which consists of treating the same with lime and phosphoric acid or a water-soluble phosphate, such as mono calcium phosphate, to cause the formation of an adsorbing and enveloping precipitate throughout the body of the settlings, wherein the liquid constituent of said settlings, subsequent to the formation of the precipitate, shall show a hydrogen ion concentration such as is indicated by a pH value of from 6.0 to 6.9, and maintaining the settlings at a temperature of 70° to 95° C. during said treatment.

9. A process for the treatment of cane juice settlings, which consists of treating the same with lime and phosphoric acid or a water-soluble phosphate, to cause the formation of an adsorbing and enveloping precipitate throughout the body of the settlings, wherein the liquid constituent of said settlings, subsequent to the formation of the precipitate, shall show a hydrogen ion concentration such as is indicated by a pH value of from 6.0 to 6.9, maintaining the settlings at a temperature of 70° to 95° C. during said treatment, and thereafter filtering said settlings.

10. A process of treating cane juice settlings, which consists of treating the same with such an amount of lime as shall cause the liquid constituent of the settlings to show a pH value of 8.0 or higher, then adding such an amount of phosphoric acid as shall cause the liquid constituent of said settlings to show a pH value of from 6.0 to 6.9, and maintaining the settlings at a temperature of 70° to 95° C. during said treatment.

11. A process of treating cane juice settlings, which consists of treating the same with such an amount of lime as shall cause the liquid constituent of the settlings to show a pH value of 8.0 or higher, then adding such an amount of phosphoric acid as shall cause the liquid constituent of said settlings to show a pH value of from 6.0 to 6.9, maintaining the settlings at a temperature of 70° to 95° C. during said treatment, and thereafter filtering said settlings.

JOHN F. BORDEN.